United States Patent [19]
Bradley

[11] 3,815,418
[45] June 11, 1974

[54] GRAVIMETERS

[76] Inventor: John S. Bradley, 3355 S. Braden Ave., Tulsa, Okla. 74135

[22] Filed: Sept. 5, 1972

[21] Appl. No.: 286,319

[52] U.S. Cl. ............................... 73/382, 73/517 R
[51] Int. Cl. .......................... G01v 7/00, G01v 7/14
[58] Field of Search....... 73/382, 514, 516 R, 517 R

[56] References Cited
UNITED STATES PATENTS

| | | | |
|---|---|---|---|
| 2,960,872 | 11/1960 | Jones | 73/517 R |
| 3,106,678 | 10/1963 | Lynn | 73/517 R X |
| 3,114,268 | 12/1963 | Boldridge, Jr. | 73/517 R |
| 3,180,151 | 4/1965 | Gustafsson | 73/382 |
| 3,194,075 | 7/1965 | Hodge et al. | 73/382 |
| 3,439,544 | 4/1969 | Boldridge, Jr. | 73/517 R |
| 3,472,076 | 10/1969 | Howell et al. | 73/382 |

*Primary Examiner*—James J. Gill

[57] ABSTRACT

This invention relates to a novel accelerometer. A charged particle within an envelope is projected as a free body at a given velocity over a fixed distance to a target within the envelope. Any acceleration of the envelope in the direction of the flight is measured as a differential time of flight from a non-accelerated time of flight. If the axis of the instrument is vertical, the difference of travel time of upward and downward flights is a function of the force of gravity at that location. Various modifications of the accelerometer as a gravimeter, as an airborne or marine gravimeter, as a borehole densitometer, for example, are given.

4 Claims, 3 Drawing Figures

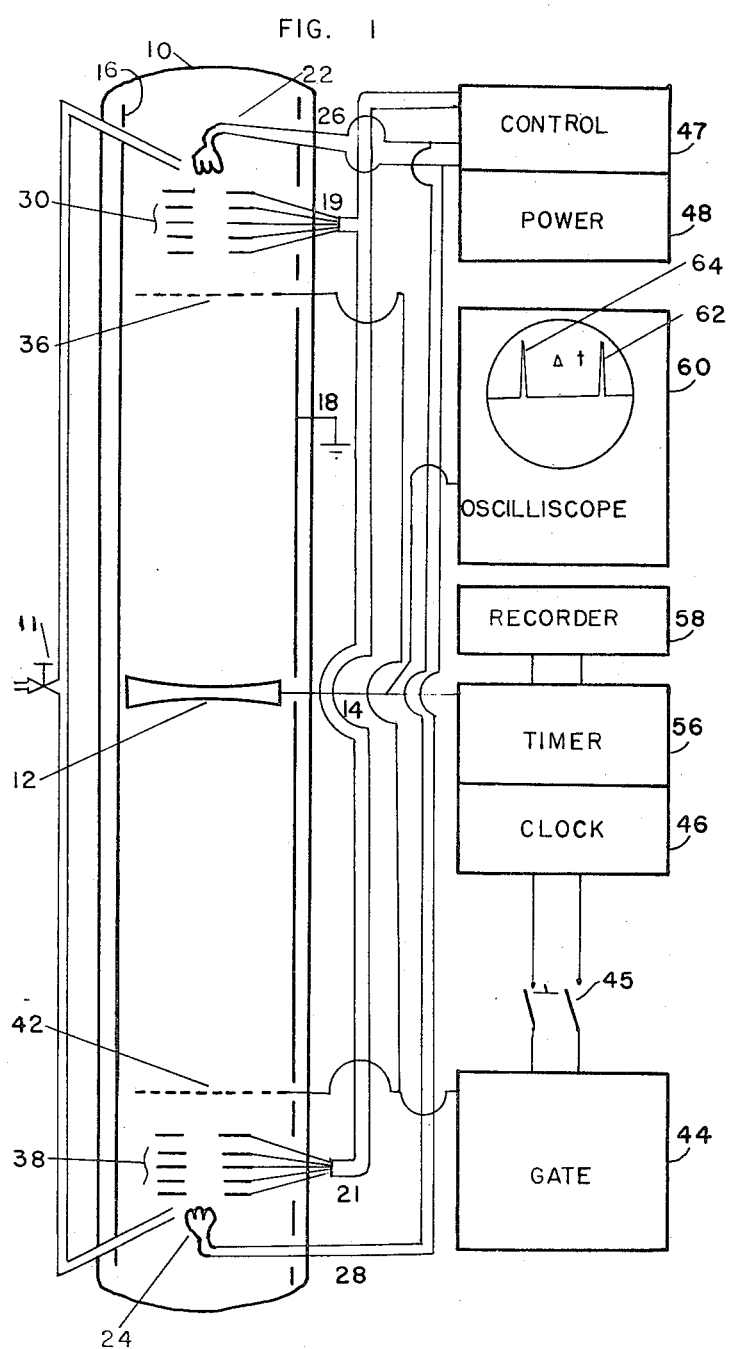
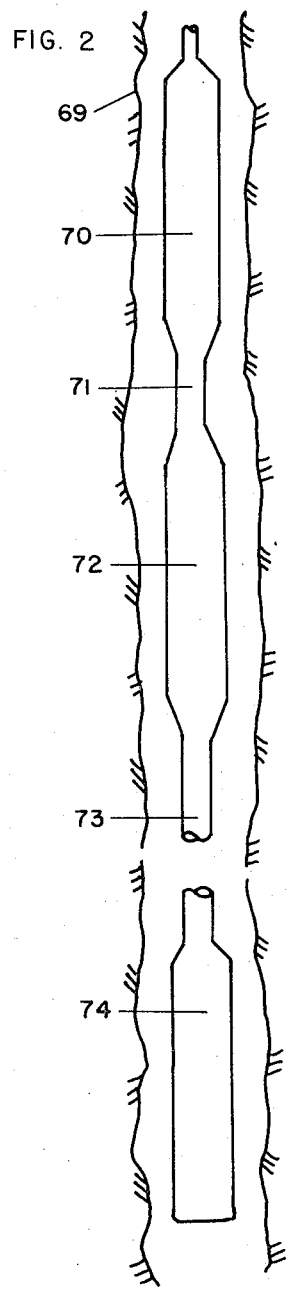
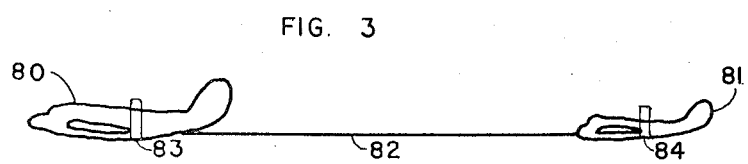

GRAVIMETERS

BACKGROUND OF THE INVENTION

This invention relates to means and methods of making measurements involving gravity field strength. It relates especially to accelerometers, gravimeters, densitometers and the like.

SETTING OF THE INVENTION

It is known that the gravity force varies considerably at different locations on the earth. The difference in gravitational forces is caused by the different densities of materials at the different locations of the earth. Gravity surveys have been conducted in the past where conventional gravity meters have been set up on the earth on precisely surveyed locations. Indications of the different gravity forces are then plotted on the map at points representing the surveyed locations. Contour lines connect points of equal gravity forces. This type gravity surveying has been used in exploration for oil and gas, mineral deposits such as iron ore. Further, many times boreholes are drilled in the earth searching for minerals. It would be quite helpful if it were possible to measure the density of different intervals throughout the depth of the well bore. Unfortunately, that is practically impossible to do with existing equipment. However, my invention discloses one embodiment which is useful for this purpose.

PRIOR ART

The closest prior art of which I am aware is U.S. Pat. No. 3,011,347, issued Dec. 5, 1961 to Boyd D. Boitnott. However, that patent discloses an instrument for measuring gravity which is considerably different from mine. The patentee establishes a cloud of droplets such as vaporized mercury in a vacuum chamber. The cloud of droplets is permitted to fall in the vacuum chamber which is responsive to the pull of gravity. Means are provided for measuring the rate of descent of the particles. The droplets are permitted to fall repeatedly.

BRIEF DESCRIPTION OF THE INVENTION

This invention relates to a novel accelerometer. A charged particle is projected at a given velocity over a fixed distance with the device stationary. A similar charged particle is projected at the same velocity over the same distance with the device accelerating. The times of flight of the particles are accurately measured and the time difference is a function of the acceleration along the axis of the device.

In one embodiment, charged particles are projected upward and downward vertically. The time of both the upward and the downward flights of the charged particles is accurately measured. The difference in travel time is a function of the force of gravity at that location. Various modifications of the accelerometer as an airborne or marine gravimeter, as a gravimeter or a densitometer in a borehole, for example, are given.

I thus take a free body in space and give it an initial velocity having a vertical component and direct it over a known "free" or unobstructed distance. I then reverse the vertical component (e.g., up to down) and give the free body the same initial velocity otherwise directed over an equal "free" distance. I then measure the diference in travel time of the two flights. This difference in time, $\Delta t$, is a measure of the gravity at that location. As will be shown, I can make these measurements in various spaced combination to obtain measurements in gravity, density, and even measurements of gravity from an airplane.

BRIEF DESCRIPTION OF THE DRAWINGS

A better understanding of the invention can be had from the following description taken in conjunction with the drawings in which:

FIG. 1 represents diagrammatically the main components of the preferred embodiment of my invention;

FIG. 2 illustrates an embodiment of my invention useful for measuring the density of intervals of the earth penetrated by a well bore;

FIG. 3 illustrates an embodiment of my invention useful as an airborne device.

DETAILED DESCRIPTION OF THE INVENTION

Attention is first directed to FIG. 1 which illustrates a dual or twin accelerometer (gravimeter) with means for directing free bodies in space at a constant velocity having an upward vertical component and causing similar free bodies to initially have the same constant velocities except for a downward velocity component due to gravity. Both paths are of the same distance. Means are also shown for measuring the difference in time of flight, $\Delta t$, of the free bodies having the upward direction and the downward direction. Shown in FIG. 1 is a glass envelope 10 which completely seals the various electronic components which I shall now discuss. It is to be noted that envelope 10 is elongated and is normally cylindrical in shape. I shall later discuss possible lengths and shapes of this envelope. In the approximate center, longitudinally of envelope 10, is plate 12 having lead 14 which extends exterior of the envelope. A grounded magnetic shield 16 having exterior lead 18 is provided to the outside of envelope 10. Shield 16 is cylindrical and elongated. The magnetic shield can be made of mumetal. It will be observed that the system above and below plate 12 is symmetrical. An upper filament 22 and a lower filament 24 having exterior leads 26 and 28, respectively, are provided at the upper and lower extremes of envelope 10. The filaments 22, 24 can be any device suitable for generating charged particles such as an ionization chamber or a cathode ionizer. Upper filament 22 has associated therewith accelerator rings 30. Just below the accelerator rings is gate grid 36.

The lower end of envelope 10 is provided with a similar charged particle generating, accelerating and gate system, as is the upper end. This includes lower filament 24, accelerator rings 38, and lower gate grid 42.

The upper side of plate 12 is concave at a radius with its center at about the center of gate 36 where the charged particle becomes a free body in space. The lower side of plate 12 is also concave at a radius from the center of lower gate grid 42. The purpose of having the plate concave is to give equal path lengths for the charged particles for various orientations from vertical of the instrument. Thus, the instrument does not have to be perfectly vertical.

The exterior lead of gate grids 36 and 42 are connected through gate control switch 44 which, in turn, is controlled by clock 46. Upper accelerators 30 and lower acclerators 38 are connected externally through leads 19 and 21 to control box 47 powered by source 48. Upper filament 22 and lower filament 24 are connected to a common power source 48 through control box 47.

I make the filaments 22 and 24 and the upper and lower accelerators, respectively, identical. I also apply the same voltages these components. This assures me that the charged particle as it passes downward through gate grid 36 has imputed to it the same velocity, except for direction, as does the charged particle going upward from gate grid 42.

Connected to plate 12 through lead 14 is an oscilloscope 60 and a timer 56, which has an output which goes to a tape recorder 58.

In operation I generate charged particles by filaments 22 and 24 and accelerate them by the accelerators. However, their movement toward plate 12 is permitted or stopped by gate grids 36 and 42. These grids are ordinarily charged the same as the charge on the charged particles so that the charged particles will be stopped. If I reverse the charge on gate grids 36 and 42, charged particles can pass through during the reversal. I accomplish this change in charge by cycling switch or control 47. It will be observed that the gate grids at the exact same instant permit the passage of the charged particles therethrough. The charged particles from the upper generator are then in effect free bodies in space having a given velocity and heading directly toward plate 12. The charged particles from the lower generating means have the same numerical velocities and are headed toward the underside of plate 12. The downward moving charged particles and the upward moving charged paticles move over the exact same distance. The only external force acting on these particles is gravity. This gravitational force will, of course, increase the velocity of the downwardly moving charged particles and reduce the velocity of the upwardly moving charged particles. Thus the downwardly moving charged particles will contact plate 12 first. This will cause a first indication in the form of a spike 64 on scope 60. A short time later the upwardly moving charged particles will cause spike 62 to appear on the scope. The distance between spikes 62 and 64 is representative of $\Delta t$, the difference in travel time of the downwardly moving charged particles and their upwardly moving counterparts. A suitable scope 60 is Model 7904 with 7A19 plug-in manufactured by Tektronix, Inc., Beaverton, Oregon. A suitable timer 56 is Model 796 Nanosecond Timer, manufactured by Eldorado Electrodata Corp., Concord, California.

If desired, I can disconnect control 44 from clock 46 by opening switch 45 and use a manually operated switch 44 (instead of being controlled by clock 46) and take a visual reading of $\Delta t$ from oscilloscope 60.

Envelope 10 can be a vacuum tube or it may contain a gas such as helium, hydrogen or neon, to reduce the velocity of the charged particles. I can add or remove gas and/or an ionizing medium through valve 11.

The device of FIG. 1 can be calibrated very easily. I lay the envelope 10 in a horizontal position. I then actuate the means for operating the charged particle, and then open gates 36 and 42 simultaneously. The charged particles from source 22 and source 24 should reach plate 12 at the same time and thus "spikes" 62 and 64 on oscilloscope 60 should coincide. If this occurs, all parts, spacing, etc., are perfect. If the "spikes" 62 and 64 do not coincide, corrections can be made. The device could also be checked by reversing the orientation.

This tool can be arranged so that it can be used to determine density of a vertical interval in the earth at a location penetrated by a well. This arrangement is shown in FIG. 2 which shows the tool suspended in well bore 69. The density of a given interval in a borehole can be found by reading the difference in the acceleration of gravity from two gravimeters spaced at that interval. There I have two gravimeters 72 and 74 held in fixed positions by connecting member 73 which preferably is metallic pipe but can be a cable, for example. If I use cables the tool should be moved so that the cables are always taut. Gravimeters 72 and 74 can preferably each be the embodiment shown in FIG. 1 except that the controls exterior of envelope 10 are housed in member 70 and at the surface. Member 70 is connected by cable or pipe 71 to gravimeter 72. It is known that the gravity force along a vertical section in the earth varies. This is due to different formations in the general area of the borehole having different densities. Underground deposits of salt, particularly, have different densities from most other formations, and thus affect the gravity forces.

I will now discuss briefly how I operate the device of FIG. 2 to make a gravity survey of the well bore. I lower the device through the well bore and repeatedly actuate gravimeters 72 and 74 in a similar manner as explained above in regard to the explanation of the accelerometers of FIG. 1. While doing this I make a continuous recording of the depth of each accelerometer so I can correlate the readings. I determine simultaneously the values of $\Delta t$ for accelerometers 72 and 74. Differential readings of $\Delta t$ at any one time are a measure of $\Delta g$ for that particular fixed interval between accelerometers 72 and 74. The density of this interval can readily be found from the $\Delta g$ just measured.

As both accelerometers are fired vertically and simultaneously, vertical acceleration or velocity of the device of FIG. 2 would not affect the differential reading $\Delta g$.

I can use a novel arrangement of my invention to make airborne measurements of gravity. A suitable arrangement is shown in FIG. 3. There is shown an airplane 80 pulling a glider 81 coupled horizontally (but free vertically) by line 82. Airplane 80 and glider 81 each have a dual accelerometer as described in FIG. 1. I actuate each dual accelerometer simultaneously. I thus obtain a $\Delta t$ measurement at each accelerometer. When the plane and/or the glider are going in smooth horizontal flight, that is there is no differential vertical velocity, $\Delta t$ is truly representative of gravity. Then if I get identical simultaneous readings on dual accelerometers 83 and 84, I can be reasonably assured that the value of $\Delta t$ is a measure of the gravity at that location. The vertical velocities of the airplane and glider will most frequently be caused by variations in air currents and the $\Delta t$ readings will not be identical. These measurements are rejected. It is, however, unlikely that air currents would affect both the same if line 82 is of sufficient length, for example several hundred yards.

I shall now give a brief consideration to why it is possible to measure the gravity field strength by comparing the time of flight of charged particles having an upward vertical velocity with those having an opposite downward velocity over a given path. I shall show $$\Delta t \approx 2g$$

(1)

where $g$ is force of gravity, or approximately 32 ft/sec². The following Equations (2) and (3) are well recognized for an object moving with or against the force of gravity:

$$V_f = V_o + gt \quad (2)$$

where
$V_f$ is final velocity in ft/sec,
$V_o$ is original velocity,
$t$ is time in seconds,
$g$ is 32 ft/sec².

$$V_a = s/t \quad (3)$$

where
$V_a$ = average velocity,
$s$ = distance.
From Equation (3) I get $$t = s/V_a \quad (4)$$

If $V_o$ is large compared to $gt$ so that $V_a$ is approximately $V_o$, the Equation (5) is a good approximation.

$$V_d = V_o + gs/V_o \quad (5)$$

where $V_d$ is velocity down.

$$V_u = V_o - gs/V_o \quad (6)$$

where $V_u$ is velocity up.

$$\Delta t = t_u - t_d = s/V_u - s/V_d \quad (7)$$

where
$t_u$ is time up,
$t_d$ is time down.

$$\Delta t = s(V_d - V_u)/V_d V_u \quad (8)$$

In Equation (8), $\Delta t$ is a function of $V_d$ and $V_u$. In Equations (5) and (6), I showed that $V_d$ and $V_u$ are functions of $g$. Therefore, $\Delta t$ is a function of $g$.

If the path length, $s$, is 1 foot, and the initial velocity of the charged particle, $V_o$, is 1000 feet per second, then from Equation 8, $\Delta t$ is approximately i s($V_d - V_u$)/$V_d V_u$ = 1(1000.032 − 999.968)/1000.032 × 999.968 = .064/10⁶ = 6.4 × 10⁻⁸ seconds where $V_u$ and $V_d$ are from Equations 6 and 5, respectively, and $g$ is taken as 32 ft/sec². This $\Delta t$ is within the time specification of the commercially available oscilloscope identified above.

The usual measure of gravity is the milligal, which is approximately $g \times 10^{-6}$. If the measure of total $g$ is $\Delta t$ of $6.4 \times 10^{-8}$ sec., the measure of a differential in gravity of one milligal, which is approximately $1 \times 10^{-6}$ of $g$ would be $\Delta t \times 10^{-6}$ or $\delta t = 6.4 \times 10^{-14}$ sec/milligal.

Using the same calculations for $\Delta t$ with $s = 1$ and $V_o = 100$ ft/sec, $\Delta t$ would be approximately $6.4 \times 10^{-5}$ seconds and $\delta t$ (for 1 milligal difference) would be approximately $6.4 \times 10^{-11}$ seconds/milligal.

For a given accuracy of time measurement, the device may be made more accurate by increasing the path length $s$ and by decreasing the initial velocity $V_o$.

While the above embodiments have been described in detail, it is possible to make modifications thereof without departing from the spirit or scope of my invention.

I claim:

1. An apparatus comprising a gravimeter which includes:
   an envelope;
   first means to project a charged particle at a given first initial velocity over a first fixed distance within said envelope, said first means includes a first charged particle source and a first concave plate having its center of radius at approximately the point the charged particle becomes a free body in space;
   second means to measure the time of flight of the charged particle over said first fixed distance;
   third means within said envelope to project a charged particle over a second fixed distance equal to said first fixed distance at a second initial velocity which is equal to said first initial velocity but having an opposite direction, said third means includes a second charged particle source and a second concave plate fixed to said first concave plate forming a double concave plate, the radius of the second concave plate having a center at approximately the point the charged particle becomes a free body in space;
   fourth means to measure the time of flight of the charged particles over said second fixed distance.

2. An apparatus as defined in claim 1 in which said envelope has been evacuated.

3. An apparatus as defined in claim 1 in which said envelope is filled with a gas to influence the velocity of said charged particles.

4. A densitometer for use in a well bore which includes:
   a first gravimeter as defined in claim 1 for placing in a vertical position in said well bore;
   a second gravimeter as defined in claim 1 for placing in a vertical position in said well bore;
   a member vertically coupling at a fixed distance said first and second gravimeters.

\* \* \* \* \*